(12) United States Patent  
Matsumoto

(10) Patent No.: US 6,399,523 B1
(45) Date of Patent: *Jun. 4, 2002

(54) WATER RETENTION NET

(75) Inventor: Koichi Matsumoto, Fukui (JP)

(73) Assignee: Asahi Doken Kabushiki Kaisha, Fukui (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,658

(22) PCT Filed: Dec. 6, 1996

(86) PCT No.: PCT/JP96/03587

§ 371 (c)(1),
(2), (4) Date: Aug. 26, 1997

(87) PCT Pub. No.: WO97/20994

PCT Pub. Date: Jun. 12, 1997

(30) Foreign Application Priority Data

Dec. 6, 1995 (JP) ............................................ 7-317835

(51) Int. Cl.[7] .................... D04B 21/10; D04B 21/20; E02D 17/20

(52) U.S. Cl. ........................ 442/1; 442/118; 442/312; 66/196; 66/195

(58) Field of Search .................... 442/1, 118, 312, 442/313; 66/195, 196

(56) References Cited

U.S. PATENT DOCUMENTS 5,601,907 A * 2/1997 Matsumoto ............... 442/1

FOREIGN PATENT DOCUMENTS

| DE | 4135714 | | 6/1992 |
|----|---------|---|--------|
| JP | 58084804 | * | 5/1983 |
| JP | 61-31241 | | 2/1986 |
| JP | 63-32566 | | 8/1988 |
| JP | 63-197720 | | 8/1988 |
| JP | 2-74647 | | 3/1990 |
| JP | 2-167927 | | 6/1990 |
| JP | 2-229247 | | 9/1990 |
| JP | 03183820 | | 8/1991 |
| JP | 5-187011 | | 7/1993 |
| JP | 5-247777 | | 9/1993 |
| JP | 7-2691 | | 1/1995 |
| JP | 7-109099 | | 11/1995 |
| JP | 08056506 | * | 3/1996 |

OTHER PUBLICATIONS

JAPIO and WPIDS database, English translation of abstract, JP 61–031241.*

JAPIO and WPIDS database, English translation of abstract, JP 02–167927.*

(List continued on next page.)

Primary Examiner—Cheryl A. Juska
(74) Attorney, Agent, or Firm—Jordan and Hamburg LLP

(57) ABSTRACT

The present invention provides a water retention net having water retentivity not obtainable in conventional nets, usable suitably, for example, to a vegetation treatment for slopes of arid places or greening treatment of deserts or the like, wherein a water absorbing resin or a water retention agent 10 mainly comprising the water absorbing resin is deposited by a coating means to at least one side of a net prepared by warp knitting, or a steric net in which a string portion 1 forming net meshes 2 has air transmittable and water transmittable gap spaces, for example, a steric structure net prepared by warp knitting, so as to provide water transmittability due to the steric structure and water retentivity due to the water retention agent together, and provide a satisfactory function of supplying water.

1 Claim, 9 Drawing Sheets

OTHER PUBLICATIONS

JAPIO and WPIDS database, English translation of abstract, JP 02–74647.*

JAPIO and WPIDS database, English translation of abstract, JP 05–187011.*

JAPIO and WPIDS database, English translation of abstract, JP 05–247777.*

JAPIO database, English translation of abstract, JP 61–076838.*

JAPIO database, English translation of abstract, JP 63–009617.*

English translation of JP 08–56506.*

* cited by examiner

WATER RETENTION NET

TECHNICAL FIELD

The present invention concerns a water retention net which is mainly utilized, for example, in greening stabilization of slopes or the like, greening treatment of deserts, cultivation of agricultural plants and the like.

BACKGROUND OF THE INVENTION

Heretofore, in a vegetation treatment with an aim of protection and greening stabilization of slopes, nets made of metal mesh or synthetic resin materials have been used in which the nets are laid over the slopes to prevent falling of soils and sands and then vegetation materials such as seeds and brought-in soils are sprayed.

However, since nets used generally have scarce water retentivity by themselves and tend to be dried and, accordingly, water required for growing plants can not be supplied enough for slopes in little rainfall districts or in arid places, so that it has been necessary to append non-woven fabrics retaining a water retention agent. Alternatively, it has been necessary to admix the water retention agent per se, for example, with brought-in soils.

Further, in recent years, use of steric structure nets in which string portions forming the net mesh are constituted into a wall or like other steric structure has been considered in the vegetation treatment with an aim of preventing the vegetation materials from being flushed away or scattered easily by window and rainfall or falling together with soils and sands (for example, JP-A-03183820(Japanese Patent Laid-Open Hei 3-183820)).

However, even in such nets, since constituent yarns are made, for example, of synthetic resin monofilaments and scarcely have water absorbing property by themselves, no sufficient water retention can be provided by the nets alone.

Further, if the net mesh is made excessively fine, it rather hinders fixation and growing of plants, increases the amount of yarns used, makes the net heavy and difficult to handle with, and expensive as well.

Furthermore, for the greening of deserts, porous pipe materials are buried underground or arranged on the surface of the ground and water is passed through the pipes to supply water to surface ground layers for instance. However, this results in problems that control for the amount of water supply is difficult and water supply is localized or partialized and it is difficult to economize water because of water evaporation.

Further, while it has been attempted to improve the water retentivity by directly mixing, for example, water absorbing resin polymers into soils and sands of deserts. However, since there is a difference in the specific gravity between the water absorbing resin polymers and soils and sands, they are not mixed uniformly but tend to be localized, so that it is difficult to ensure uniform water retention over the entire area. Further, since the water absorbing resin polymers are poor in the weather resistance, it is almost impossible to use them for long years with no loss of the water retaining effect.

The present invention has been accomplished in view of the foregoings and intends to provide a water retention net having a water retentivity not obtainable in conventional nets and capable of being used suitably to water retention or water absorption in vegetation treatment for slopes, greening treatment for deserts or green treatment of cities, particularly, in steric structure nets as well as in usual nets made of synthetic fiber yarns.

DISCLOSURE OF THE INVENTION

The water retention net according to the present invention for solving the foregoing subjects comprises a net prepared by warp-knitting in which a water absorbing resin or a water retention agent mainly comprising the resin is deposited to a string portion forming a net mesh.

According to the water retention net of the present invention, since the water absorbing resin or the water retention agent mainly comprising the resin is deposited to the string portion forming the net mesh, water given by spraying or rainfall or water in the ground or air is absorbed and retained in the water retention agent. Particularly, in the net prepared by warp-knitting, since the string portion comprises a continuous sequence of knit meshes, the water retention agent is easily retained in the knit mesh opening portion to increase the amount of water retained. Further, thus retained water is gradually released. Accordingly, a satisfactory function of supplying water can be provided by laying the net, for example, on the slopes of arid places or waste lands.

The water retention net of the invention is a steric structure net in which the string portion forming the net mesh has a steric shape having air transmittable and water transmittable gap spaces wherein the water absorbing resin or the water retention agent mainly comprising the resin is deposited at least on one side substantially over the entire area thereof.

According to the water retention net of the present invention, since the net constitutes, as a whole, a steric structure having a required thickness, it possesses satisfactory air transmittability and water transmittability by the possession of gap spaces in the steric string portion. In addition, since the water retention agent is deposited at least on one side of the net, it has excellent water retentivity in the same manner as described above. Therefore, when it is laid and used, for example, on the slopes of arid places or waste lands, it has an effect of preventing falling of soils and sands and vegetation materials by the net and provides a satisfactory function of supplying water.

In the steric structure net, according to the invention the string portion is constituted into a steric shape having air transmittable and water transmittable gap spaces with front and back fabric portions knitted at a width for one or plurality of wales respectively by warp knitting and connecting yarns for connecting both of the fabric portions, and the string portion is continuous in the knitting direction and knotted alternately with string portions which are in continuous on both sides in the front and back string portions respectively.

In this invention, not only satisfactory air transmittability and water transmittability can be ensured by the steric structure of the string portion defining the net mesh but also the water retention agent can be deposited concentrically by utilizing fine gap spaces and large surface area formed by knitting the front and back fabrics of the string portion. Therefore, the water absorption and water retention by the water retention agent, combined with the water retention by the assembly of the fibers, can increase the water retention as the entire net and, also in combination with the steric string portion that serves as the water supply channel, can provide a further excellent function of water supply.

Further, it is possible to use a steric structure net in which string portion formed by the front and back fabric portions and the connection yarns is knotted with adjacent string portions at the front and back fabric portions on every predetermined pitch in the continuing direction while being positionally displaced from each other, and the portions of the connection yarns for connecting the front and back fabric portions in each of the string portions are alternately inclined rightwardly and leftwardly to form a truss structure.

In this case, when load and pressure exert on the net in the direction of the thickness, they act so as to regulate the turning-down of the string portions to each other and the shape of the net mesh and the steric structure of the net are stabilized. That is, it is strong to the load and pressure in the direction of the thickness, excellent in the pressure resistance and shape retainability and has good. elastic force. Accordingly, also when it is buried and used underground, the string portion is not collapsed but keeps a steric state to possess a satisfactory water supply function.

Furthermore, even if a net mesh of a relatively large opening is formed, since the ratio of area occupied by the string portions is considerably large for the entire net in average and the surface area for the yarns constituting the net is also large, a great amount of the water retention agent can be deposited and retained by so much to further enhance the water retaining effect.

In the steric structure net in each of the inventions, the yarns forming mesh at least in the front and back fabric portions are suitably comprised of a plurality of aligned monofilament yarns, multifilament yarns of synthetic resin or yarns comprising a combination of them.

That is, since the fiber density for the front and back fabric portions of the string portion is increased by the constitution described above and, although this is a net, the water retention agent or the adhesive containing the water retention agent deposited by the coating means such as dipping intrudes as far as the inside of the string portion and is deposited so as to wrap the constituent yarns, the water retention agent can be retained more stably. Particularly, the retention of the water retention agent is satisfactory in a state of absorbing water and swelling to increase the volume. Therefore, if it is used being laid on the slopes or buried underground, the water retention agent is not fallen easily.

Further, it may have a constitution in which a string portion not having connection yarns is provided so as to form a mesh opening smaller than that of the string portion having connection yarns for defining the net mesh opening space, in at least one of the front and back fabric portions in the steric structure net.

In this steric structure net, bending deformation or the like of the string portion defining the net mesh opening space can be restricted by the string portion not having the connection yarns, by which the steric state of the string portion defining the net mesh opening space and the shape of the net mesh opening space can be retained more preferably.

In each of the inventions, the water retention agent is preferably deposited to the net by a coating means such as dipping. For example, the water retention agent is mixed with a volatile solvent, water or other additive and deposited by coating to the net before it is solidified.

With such a constitution, the water retention agent can be deposited surely to the yarns constituting the net and retained without dropping easily during use and satisfactory water retentivity can be kept for a long period of time.

Further, the retention agent can also be mixed with an adhesive and deposited to the net by the coating means. As the adhesive, use of an aqueous adhesive is preferred with a view point for the effect of the water absorbing and water retaining effect.

In this case, even if the net constituting yarns are made of monofilaments of synthetic resin, the water retention agent is surely deposited and maintained by the adhesive and the water absorbing and water retaining property can be maintained satisfactorily for a long period of time.

Further, due to the deposition of the adhesive, binding strength between the yarns constituting the net is increased, stitches are less tend to be slackened, the steric structure is more stabilized, the elastic force and the compression resistance are increased, and the steric shape of the string portion defining the net mesh opening can be kept more easily even when the net mesh opening are formed to be large, so that the net mesh opening space is maintained in the steric shape and roots of plants extend easily through the net meshes.

BEST MODE FOR CARRYING OUT INVENTION

Figure 1:
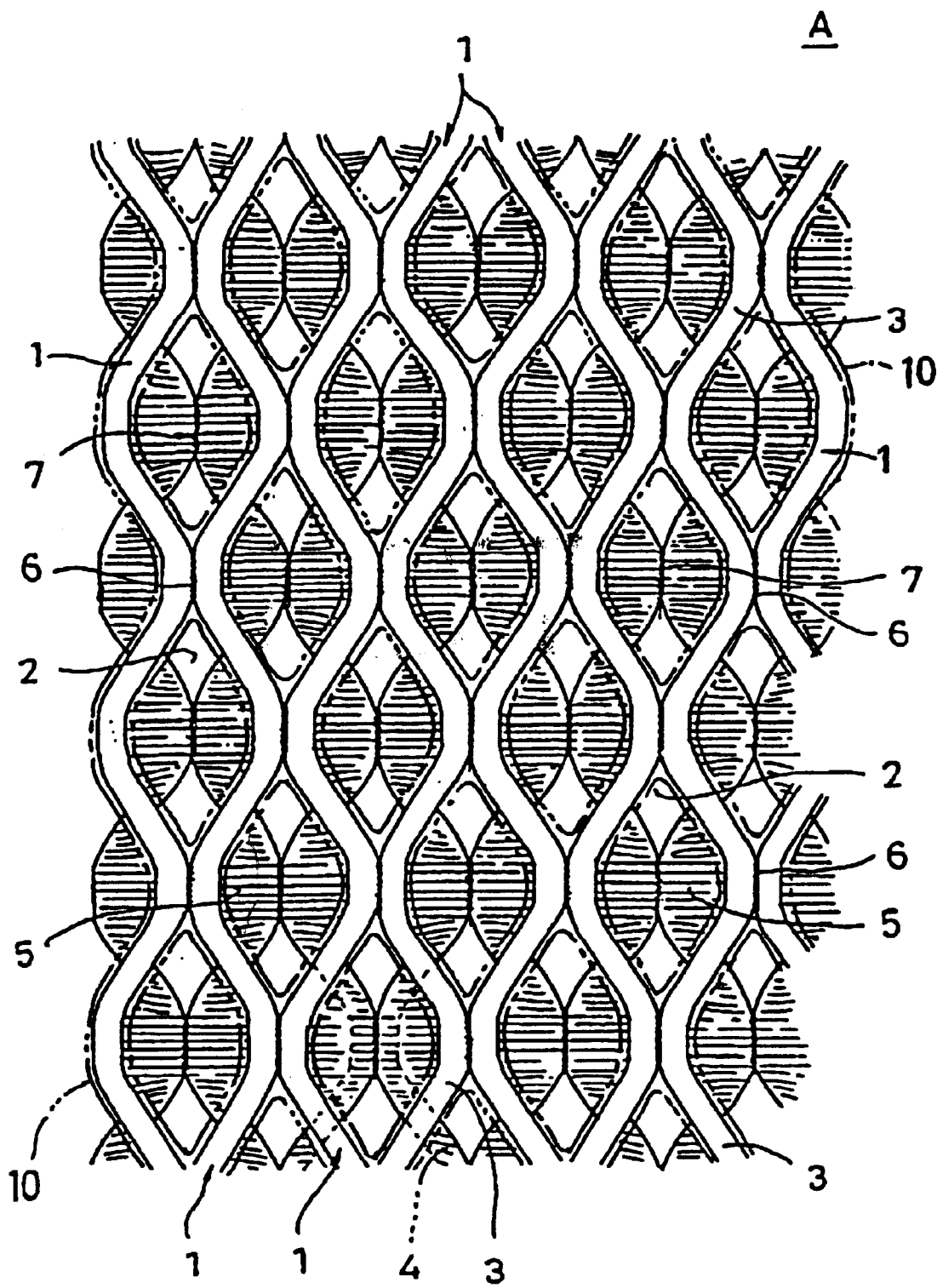
FIG. 1 is a schematic plan view illustrating one embodiment of the present invention.

Next, the mode of practicing the present invention is to be explained with reference to the drawings. FIG. 1 shows an appearance of one embodiment of a water retention net (A) comprising a truss type steric, or three-dimensional structure net which is warp knitted, for example, with synthetic fiber yarns, FIG. 2 shows an enlarged perspective view for a portion thereof and FIG. 3 is an enlarged cross sectional view.

In the drawing, (1) indicates a string portion defining a net mesh opening (2), and (3) and (4) indicate, respectively, front and back fabric portions each in a net shape. (5) indicates connection yarns as a connection portion between the front and back fabric portions (3) and (4). The string portion (1) is formed as a steric shape substantially having gap spaces which are air transmittable and water transmittable in the longitudinal direction, as well as in the inside to outside direction through gaps between each of a number of the connection yarns (5) and (5) by connecting the front and back fabric portions (3) and (4) by laying the connection yarns (5) across both of them. (8) indicates an internal space. (10) indicates a water retention agent deposited as described later.

Figure 2:
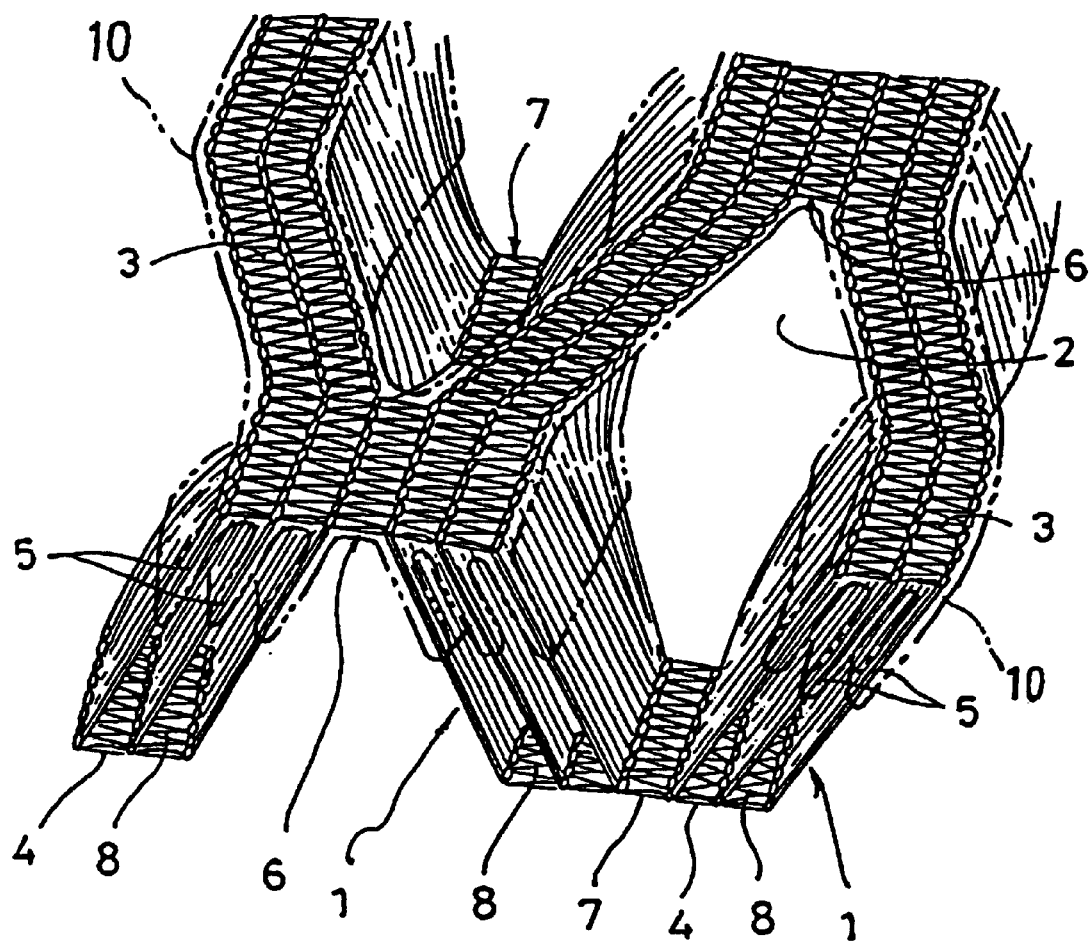
FIG. 2 is an enlarged perspective view for a portion thereof.
Figure 3:
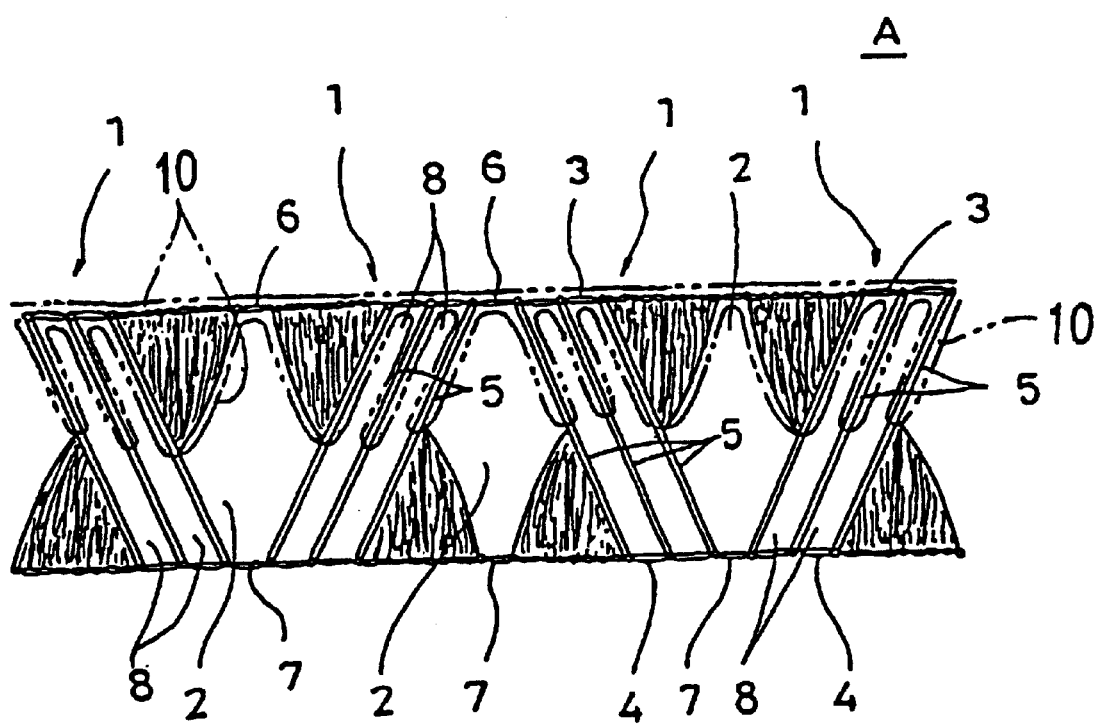
FIG. 3 is an enlarged cross sectional view for a portion thereof.

The water retention net (A) in the embodiment of FIG. 1 to FIG. 3 is warp knitted by a double raschel machine having two rows of needle bases and basically comprises the front and back fabric portions (3). and (4) knitted by chain knitting yarns and insertion yarns, and connection yarns (5)

connecting the front and back fabric portions (3) and (4), in which the front and back fabric portions (3) and (4) are knitted and in continuous in one direction. Each of the front and back fabric portions (3) and (4) is knotted with adjacent string portion on every predetermined pitch in the knitting direction to constitute a steric structure net. Particularly, the knot portions (6), (7), or joining portion, in the front and back fabric portions (3) and (4) are positionally displaced from each other between the front and back and the connection yarns (5) for the string portion (1) are alternately inclined rightwardly and leftwardly to form a truss structure.

That is, the front and back fabric portions (3) and (4) of the string portion (1) have a width for a plurality of wales as shown in an enlarged scale in FIG. 2 and FIG. 3 (three wales in the figure), and connection yarns (5) are laid across and knitted in at least two wales on both side ends (all wales in the figure) between the front and back fabric portions (3) and (4), whereby the string portion (1) of a substantially hollow steric shape having a space (8) between each of the connection yarns (5) and (5) is continuously constituted in the knitting direction.

Further, each of the string portions (1) is knotted with adjacent string portions (1) on both sides alternately at the front and back fabric portions (3) and (4) at different positions by different knot insertion yarns respectively, that is, such that the knotting portion 6 at the front and the knot portion (7) at the back are positionally displaced from each other. Whereby the portion of the connection yarns (5) are alternately inclined rightwardly and leftwardly on every predetermined pitch in the continuing direction of the string portions (1) forming a truss structure in which the net mesh opening (2) is in a substantially V-cross sectional shape or inverted V-cross sectional shape.

Figure 4:
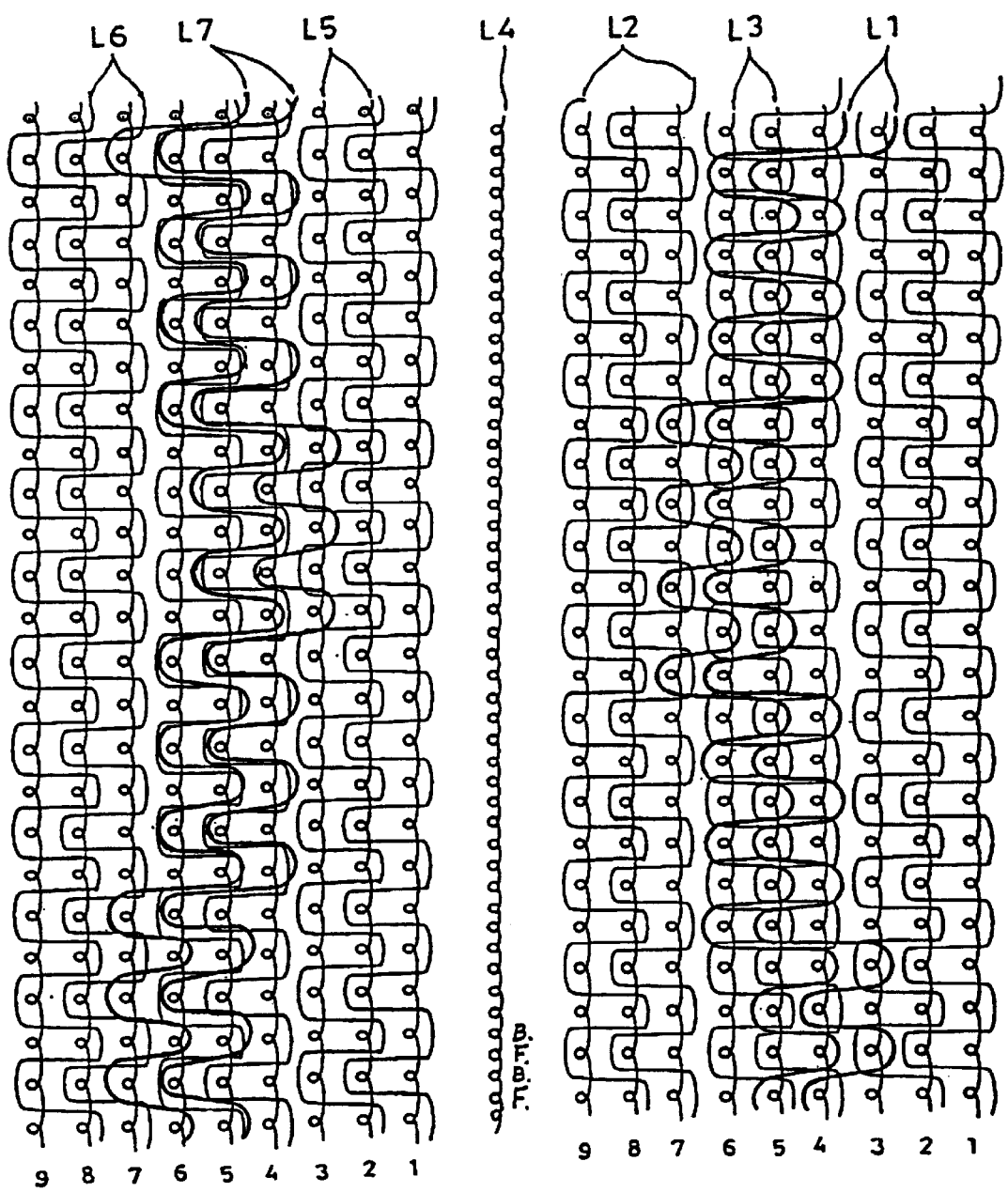
FIG. 4 is a view for a lapping state illustrating a concrete example of a knitted tissue of a steric structure net.

FIG. 4 shows one example of a knitted tissue of the truss type steric structure net. In the figure, (L3), (L2) and (L1) indicate a chain knitting reed, an insertion yarn reed and an insertion yarn reed for knotting, on the front. (L5), (L6) and (L7) indicate a chain knitting reed, an insertion yarn reed and an insertion yarn reed for knotting, on the back. (L4) indicates a reed for connection yarns.

According to the knitted tissue diagram, on the front side, the front fabric portion for each of string portions is knitted by stitch rows for three wales by the chain knitting reed (L3) and the insertion yarn reed (L2), and the front fabric portions of adjacent string portions are alternately knotted rightwardly and leftwardly for one or plurality of courses by shifting knitting yarns for knotting inserted under lateral swinging by other insertion yarn reed (L1) alternately rightwardly and leftwardly on every predetermined pitch of courses. on the back side, back fabric portion of each of the string portions is knitted by the chain knitting reed (L5) and the insertion yarn reed (L6) respectively, and the back fabric portions for the string portions are knotted for one or several courses by shifting the insertion yarns for knotting inserted under lateral swinging by other insertion yarn reed (L7) to the right and left sides opposite to that on the front side on every course pitch corresponding to the knot portions on the front fabric portion. Then, the connection yarns are laid across the front and back fabric portions at each wale of the string portion and connecting them, by an entire gathering reed (L4).

Figure 5:
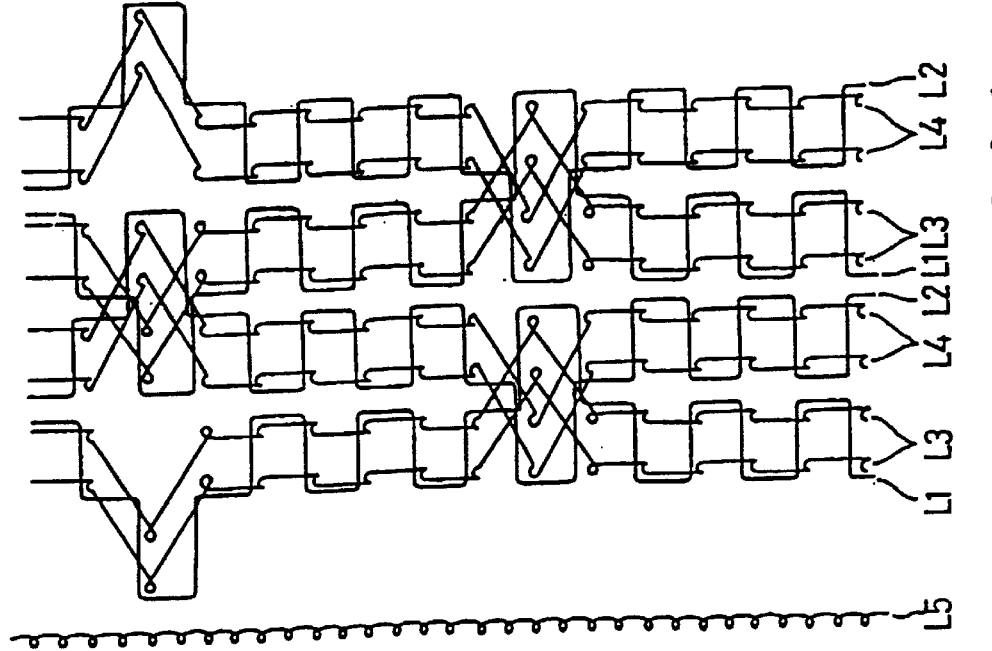
FIG. 5 is a view for a lapping state illustrating another concrete example of a knitted tissue of a steric structure net.
Figure 5:
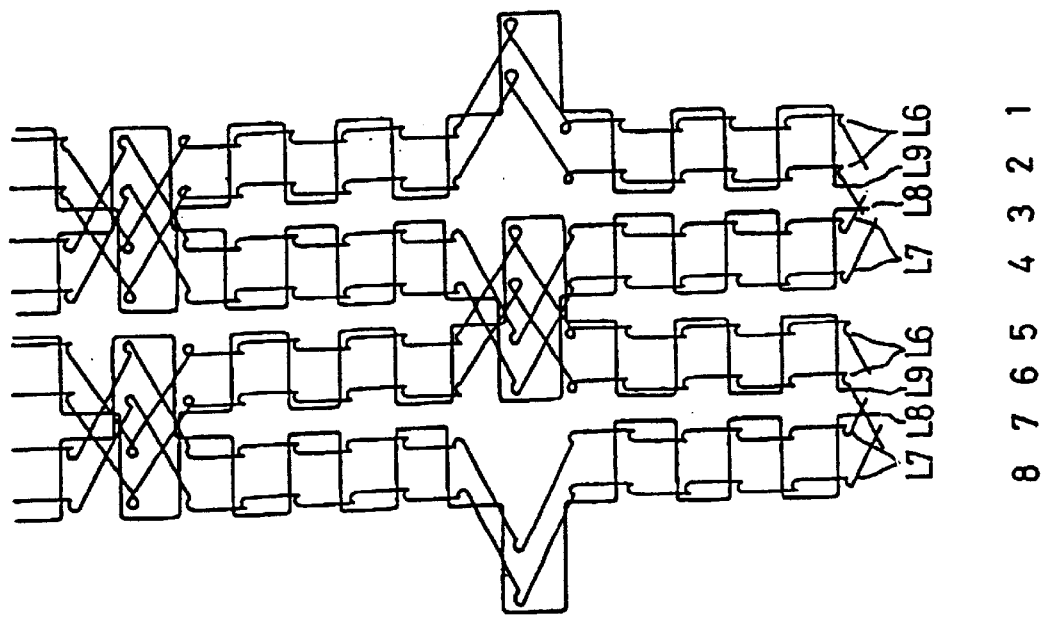

Further, FIG. 5 indicates other knitted tissue of a steric structure net in which (L1), (L2) and (L3), (L4) indicate insertion yarn reeds and chain knitting reeds on the front, (L6), (L7) and (L8), (L9) indicate chain knitting reeds and insertion yarn reeds on the back and (L5) indicates a reed for connection yarns.

In this knitted tissue, on the front side, each of the front fabric portions of the string portions are knitted by stitch rows for two wales by the chain knitting reeds (L3), (L4) and the insertion yarn reeds (L1), (L2), respectively, and knotted with the front fabric portions of the adjacent string portions on right and left sides by laterally shifting the chain knitting reeds (L3), (L4) alternately rightwardly and leftwardly by two wales on every predetermined course corresponding to the net mesh opening and then returned to the original position. On the back side, the back fabric portions of the string portions for two wales are knitted by the chain knitting reeds (L6), (L7) and the insertion yarn reeds (L8), (L9), and knotted alternately with the back fabric portion of the adjacent string portions on right and left side by laterally shifting the chain knitting reeds (L6), (L7) by two wales alternately rightwardly and leftwardly opposite to the front side, on every predetermined course, and then returned to the original position. Then, the connection yarns are laid across the front and back fabric portions for connection at each wale of the string portion, by an entire gathering reed (5).

After knitting the tissue as described above, the knitted fabric is properly widened to take a form of a net or mesh, and heat setting is applied so as to properly open the net mesh opening (2). Thereby the yarns used are provided with an appropriate rigidity and shape retaining force.

The knitted tissue described above merely shows an example of the steric structure net and it is not restricted only thereto but can be practiced by using various steric structure nets.

Figure 6:
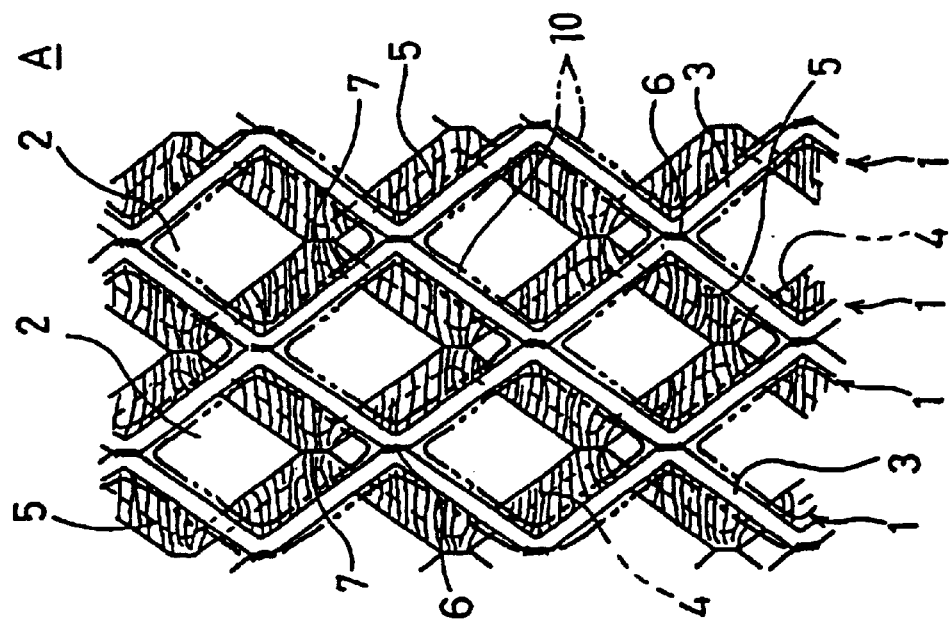
FIG. 6 is a schematic plan view illustrating another embodiment.

For example, by properly changing the number of courses (pitch) for displacing the positions of the front and back knot portions (6), (7) from each other, front and back knot portions (6), (7) may be positionally displaced slightly from each other, for example, as shown in FIG. 6.

Figure 7:
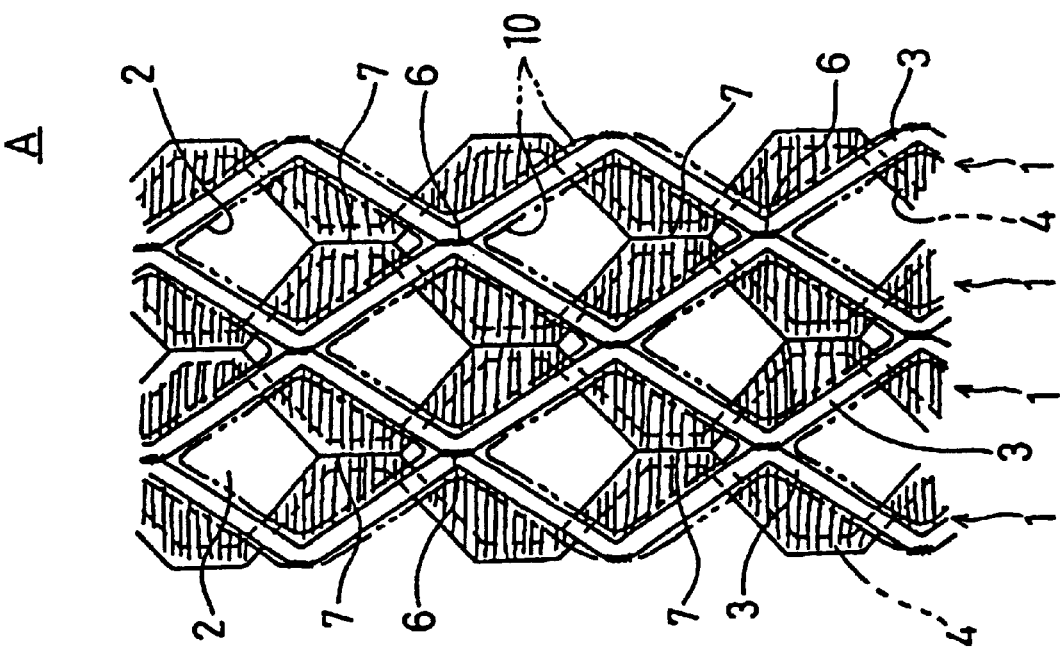
FIG. 7 is a schematic plan view illustrating a further embodiment.
Figure 8:
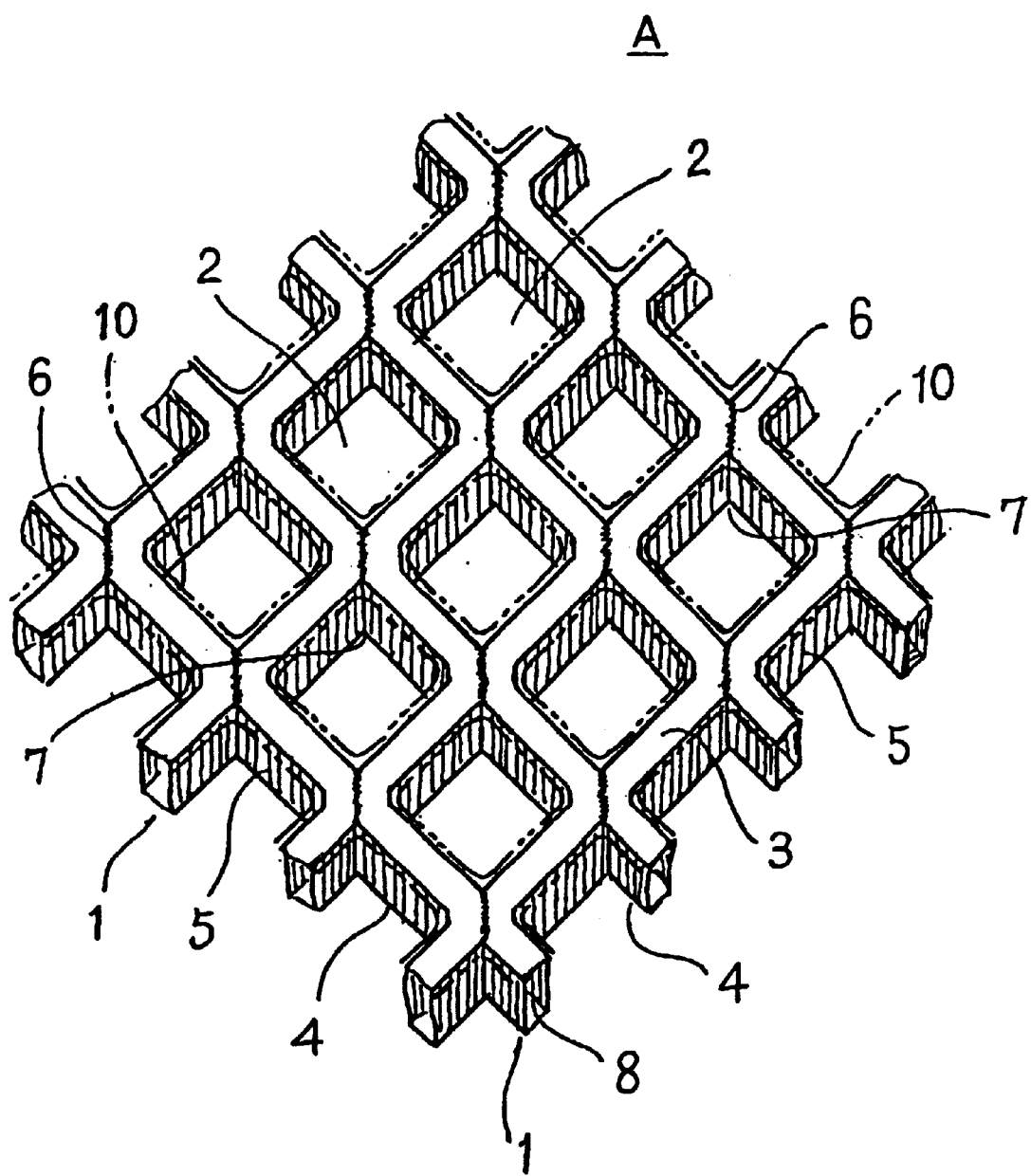
FIG. 8 is a schematic perspective view illustrating a further embodiment.

Further, the knotting length in the wale direction of the knot portions (6), (7) of the front and back fabric portions (3), (4) is not necessarily identical, but it may be practiced, for example, as shown in FIG. 7 such that the knotting length of the knot portions (6), (7), that is, the number of the knotting courses may be different between the front and back sides of the fabrics. Further, a net mesh opening as shown in FIG. 8 can be constituted by substantially aligning the positions for knot portions (6), (7).

Figure 9:
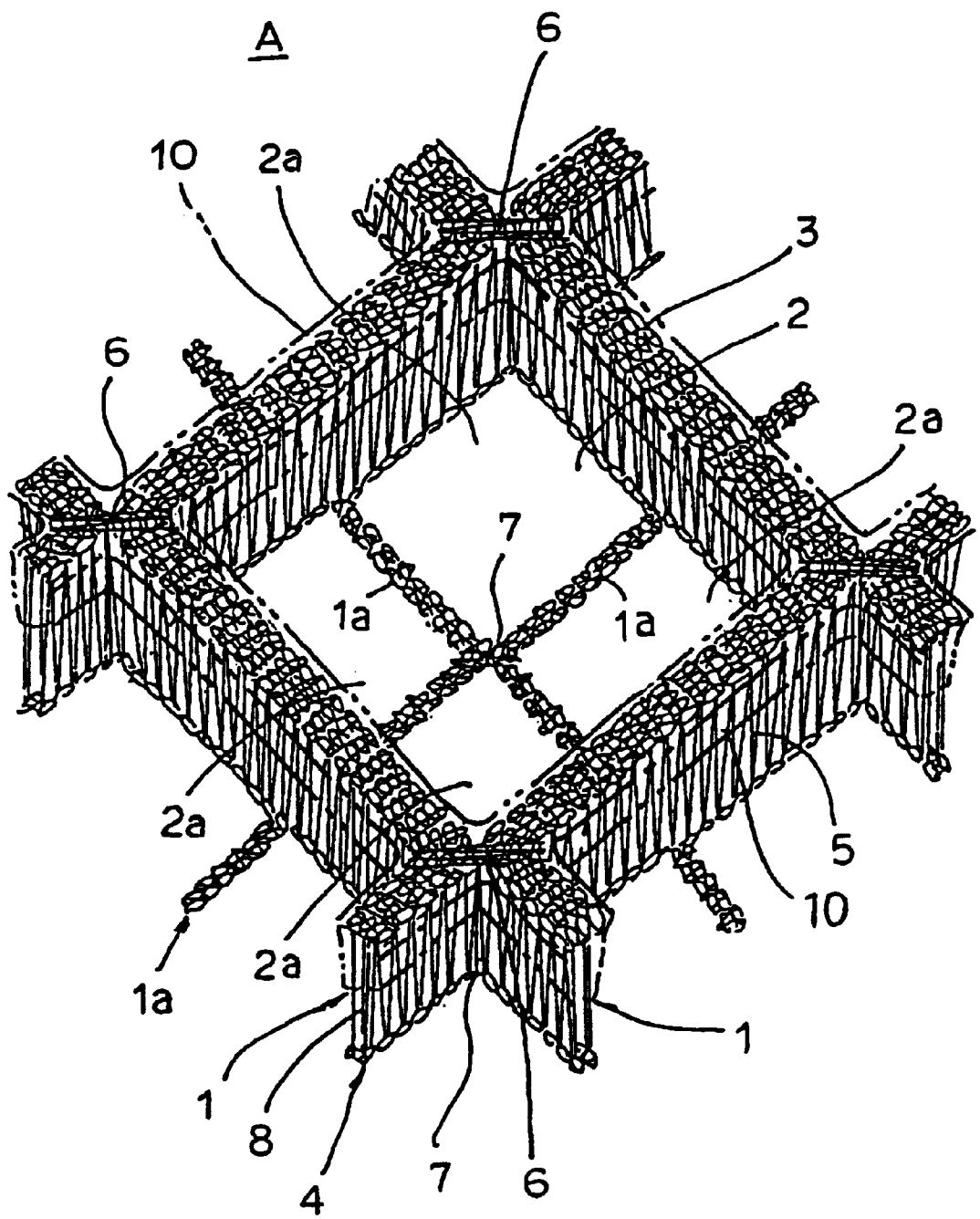
FIG. 9 is a schematic perspective view illustrating a still further embodiment.

Further, it may also be practiced by forming the net mesh openings different in the size between the front and back sides and, particularly, as shown in FIG. 9, a string portion (1a) not having connection yarns (5) so as to form a mesh opening (2a) smaller than the net mesh opening (2) defined by the connection yarns (5) included in the string portion (1) can be disposed to at least one of the front and back fabric portions (3) and (4). In this case, it is also possible to satisfactorily maintain the shape of the string portion (4) and the net mesh opening space and retain other material in the net mesh opening space.

In each of the embodiments, the string portion (1) may be provided with a width of four or more wales (usually, 2 to several tens wales) or merely constituted with a stitch row of one wale.

While yarns used for the steric structure net is not particularly limited and synthetic fiber yarns of excellent water proofness are usually used. Multifilament yarns or monofilament yarns of various kind of synthetic fibers such as nylon yarn, carbon fiber yarn are preferably used in view of durability or the like. In a case of increasing the fiber density to improve the retentivity of the water retention agent, an aligned yarns of a plurality of monofilament, multifilament yarns or yarns comprising a combination of them may be used. Yarns of natural fibers or yarns of biodegradable fibers can of course be used, which can provide water retention nets gentle to environments.

The connection yarns (5) are properly selected from synthetic fiber yarns or natural fiber yarns while considering elasticity, strength or the like in the foregoings such that they are suitable to connect and sterically support the front and back fabric portions (3) and (4). Mainly monofilament yarns are preferably used with a view point of retaining the steric structure, while a plurality of yarns may be used in combination.

The yarns may be provided properly with rigidity or compression strength, by heat setting or synthetic resin finishing after knitting. The diameter and the material for the yarns are determined while considering the strength, tension and elasticity required depending on the uses.

For example, in a case of use as a net for stabilizing slopes by greening, there are used yarns of 100 to 5000 denier, preferably, 200 to 1000 denier for the front and back fabric portions, and yarns of 100 to 5000 denier more preferably, 200 to 2000 denier for connection yarns.

Then, in the water retention net (A) of the present invention, a water absorbing resin or a water retention agent mainly comprising the water absorbing resin is deposited substantially over the entire area at least on one side of the steric structure net.

As the water retention agent, those resins generally known as water absorbing resins, for example, acrylic acid grafted starch, vinyl alcohol—acrylic acid block copolymer, crosslinked acrylic acid, modified polyvinyl alcohol or the like which absorb and retain a great amount of water upon contact therewith can be used preferably.

Further, as the water retention agent, those resins having water absorbability used generally as a thickening agent can be used by being provided with water retentivity by utilizing crosslinking reaction or the like.

For example, a copolymer of N-vinylacetoamide and sodium acrylate developed as a thickening agent (GE-167, manufactured by Showa Denko Co.) can be used by adding epoxy compounds so as to utilize crossinking by the epoxy compounds. Thus obtained water retention agent is resistant to salts, has high light fastness, and does not easily leach the water absorbing resin even after absorbing water. Thus, the water retention agents preferably used. In particular, it possesses a sufficient durability even in a use at a place near the seaside.

The water retention agent described above can be deposited to the net (A) by coating means utilizing the stickiness of the water retention agent per se. In otherwise, after the water retention agent is mixed with other additive and volatile solvent or water, the stickiness till it is solidified is utilized. The water retention agent, when used in admixture with ethylene glycol, can be provided properly with softness and flexibility in a state deposited to the net and is not easily detached by the movement such as extension or shrinkage of the net.

Further, also the water retention agent comprising previously-described water absorbing resin can be deposited to the net in the same manner by a coating means. In otherwise, it is desirably deposited to the net (A) by the coating means after admixed with adhesive, in view of the retentivity of the water retention material. In this case, use of water-soluble or water-dispersible adhesives is particularly preferred in view of practical use since the water absorbing and retaining property are further improved.

The coating means may be a usual coating method such as applying or spraying, as well as a method of dipping, that is, immersing in a solution of the agent. Further, it is not only deposited by the coating using the adhesive described above only to the portions of the front and back portions (3) and (4) but also it may be penetrated by the coating means as far as the intermediate portion in the direction of the thickness of the string portion (1) of the steric structure net and deposited and retained thereto, or may be deposited on entire net by the coating means.

Further, if it is coated at least on one side of the steric structure net in a shrinked state to close the net mesh opening (2), it is easily coated to the front and back fabric portions (3) and (4) and the water retention agent can be retained satisfactorily. In particular, if each of the front and back fabric portions (3) and (4) of the string portion (1) of the net are knitted with one or plurality of wale width, the adhesives can be deposited and retained more easily in spite of forming a net structure.

In addition, a hot melt type synthetic resin or adhesive may be coated, for example, to the net (A) and the powder of the water absorbing resin may be deposited thereto.

Then, the water retention net (A) to which the water retention agent (10) is deposited and retained on the steric net structure as described above has satisfactory air transmittability and water transmittability since the string portion (1) defining the net mesh opening (2) has air transmittable and water transmittable gap spaces. Further, satisfactory water retentivity can be provided by the water retention agent (10) deposited at least on one side even if the net constituting yarns are synthetic resin monofilaments.

Therefore, in the vegetation treatment with an aim of protection and greening stabilization, for example, of slopes it can provide an effect of collecting and draining water upon rainfall due to water transmittability by the possession of gap spaces in the steric string portion, is excellent in water retentivity and can provide a sufficient function of supplying water required for the growth of plants even in a place tended to be dried and with little rainfall.

Figure 10:
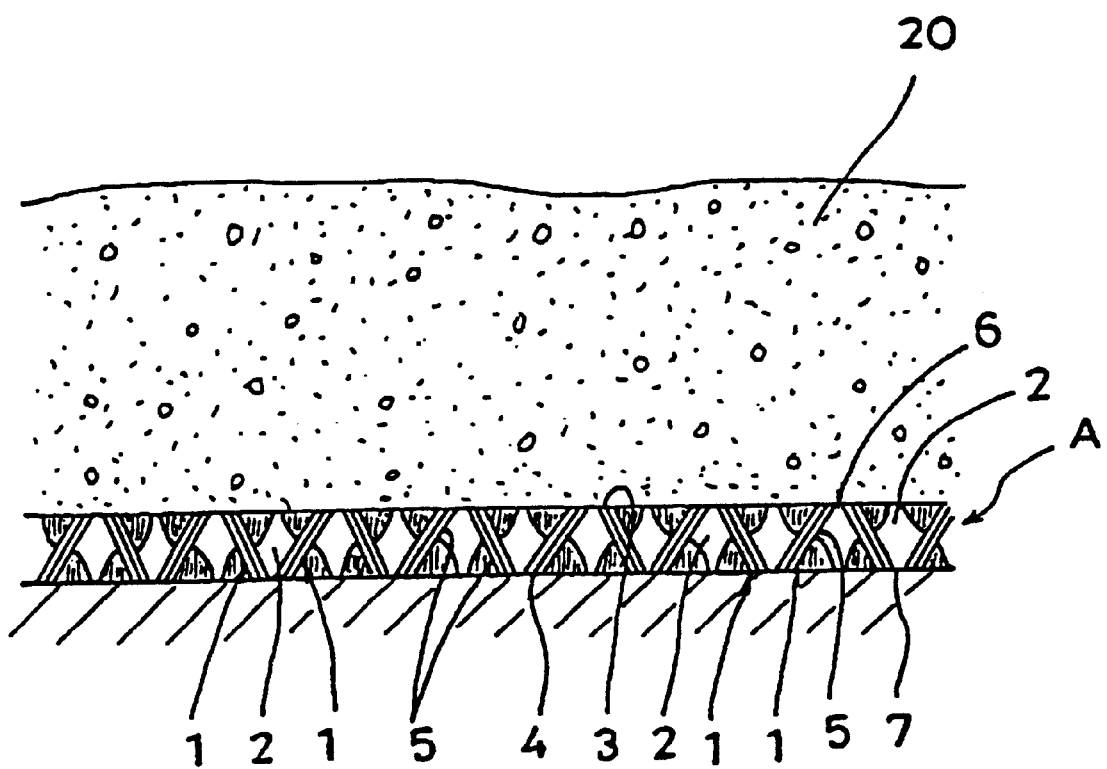
FIG. 10 is a cross sectional view in a case of use as a water supply net in a desert area.

Further, as the measure for the greening treatment of the desert, when the net (A) of the present invention is buried and used in the desert soil 20 as shown in FIG. 10, it can retain sufficient water retentivity and a function of preventing evaporation over a wide range, can supply water for a wide range since the string portion serves as a water supply channel, can easily control the amount of water supply and it can supply water satisfactorily. In addition, it is not necessary to append other material such as non-woven fabric on the net and can be used at a reduced cost. Further, water can be economized by the water absorbing function and the evaporation preventive function by the water retention agent.

In addition, since the net mesh opening space. of the steric structure net is large enough, when the net is buried in or laid on the ground, it allows free passage of water upon leaching for flushing out salts in the ground or rainfall water, so that salts can be flushed out easily with no clogging upon leaching thereby preventing occurrence of salt damages caused by accumulation of salts.

In the case of a steric structure net, it is possible to use other properly water retaining or water absorbing materials such as water retaining agent in pack, water retaining fibers, water absorbing fibers, water retention mat and water retention paste by inserting and retaining them to the steric net mesh opening space or to the steric string portion. Further, vegetation materials such as packaged chemical fertilizers or seeds can be retained.

In the embodiment illustrated in the drawings described above, explanation has been to a case where the net is a steric structure net but the present invention can also be practiced in usual warp knitted net not in a steric shape, by constituting a water retaining net by depositing the same water retention agent as described above by the same means as described above to the string portion defining the net mesh opening.

Also in the case of this net, deposition and retention of the water retention agent are improved by using various kinds of yarns described above for the constituent yarns and forming stitches by warp knitting such that the string portion defining the net mesh opening has a width of one or plurality of wales. Further, those knitted by using a plurality of aligned monofilament yarns, multifilament yarns or yarns comprising a combination of them are preferred in view of satisfactory deposition and retention of the water retention agent.

INDUSTRIAL APPLICABILITY

As described above, by the water retention net according to the present invention, both of usual nets and steric structure nets can be used as the vegetation nets possessing satisfactory water retention not obtainable in the conventional nets and used in the vegetation treatment for the slopes in little rainfall places or in arid places, as water retaining and supplying nets for greening stabilization of deserts or as water retaining or supplying nets in greening of cities.

In particular, the steric structure nets have satisfactory air transmittability and water transmittability due to the retention of gap spaces, have excellent water collecting and draining function and water retaining function together. Further, it can be used more suitably to the above mentioned application use for the desert area or the like due to the effect of preventing salt accumulation, for example, by leaching taking advantage of allowing free passage of water and salts by the net mesh opening space.

what is claimed is:

1. A three-dimensional net formed by warp knitting comprising:

three-dimensional string portions each defining net mesh opening spaces in the three-dimensional net and being continuous in a knitting direction and including a front-side fabric portion and a back-side fabric portion, each knitted at a width for one or a plurality of wales by warp knitting, and connection yarns for connecting both the front-side and back-side fabric portions with a gap therebetween, through which water and air are transmittable; and the front-side and back-side fabric portions of each three-dimensional string portion being alternately joined with rightward and leftward adjacent three-dimensional string portions at every predetermined pitch in the knitting direction, each of said front-side and back-side fabric portions having a knitting repeat pattern, the knitting repeat patterns of said front-side and back-side fabric portions being offset from one another by a half repeat, wherein:

a position of the joining portion at which the front-side fabric portion of one three-dimensional string portion is joined to the adjacent three-dimensional string portion is displaced along said one three-dimensional string portion from a corresponding position of the joining portion at which the back-side fabric portion of said one three-dimensional string portion is joined to the adjacent three-dimensional string portion;

the connection yarns between the front-side and back-side fabric portions of each three-dimensional string portion are alternately inclined leftward and rightward at every predetermined pitch in the knitting direction while inclination of the connection yarns in every adjacent two of the three-dimensional string portions are in a manner of offsetting each other, so that the connection yarns extended from each of the joining portions to rightward and leftward ones of the three-dimensional string portions are in opposite inclinations to constitute a truss structure; and a thickness-wise stress applied onto the front-side or back-side fabric portion is converted to a horizontal stress applied to back-side or front-side fabric portion by way of the connection yarns inclined leftward and rightward from each of the joining portion to resist collapsing.

* * * * *